United States Patent [19]
Bryant

[11] Patent Number: 5,853,637
[45] Date of Patent: Dec. 29, 1998

[54] METHOD OF REPLICATING IMAGES OF BIOLOGICAL SPECIMENS ONTO LEATHER

[76] Inventor: Terry Keith Bryant, 718 Griffin Ave. Apt. 236, Enumclaw, Wash. 98022-3462

[21] Appl. No.: 535,343

[22] Filed: Sep. 28, 1995

[51] Int. Cl.[6] ............................ B29C 33/40; C14B 1/32
[52] U.S. Cl. ........................ 264/132; 264/220; 264/293; 264/322; 69/2; 69/8
[58] Field of Search ...................... 264/129, 132, 264/293, 294, 296, 220, 225, 322; 69/2, 8, 29, 48

[56] References Cited

U.S. PATENT DOCUMENTS

| | | | |
|---|---|---|---|
| 1,175,998 | 3/1916 | Shaw. | |
| 1,470,535 | 10/1923 | Kolb. | |
| 3,298,881 | 1/1967 | Higley et al. | 264/293 |
| 3,769,114 | 10/1973 | Weigert | 264/132 |
| 3,917,786 | 11/1975 | Weigert | 264/129 |
| 4,073,853 | 2/1978 | Chestnov | 264/132 |
| 4,864,790 | 9/1989 | Liardet | 52/316 |
| 4,971,743 | 11/1990 | Lang | 264/132 |
| 5,116,562 | 5/1992 | Lang | 264/132 |
| 5,182,063 | 1/1993 | Lang et al. | 264/132 |

*Primary Examiner*—Jan H. Silbaugh
*Assistant Examiner*—Mark Eashoo

[57] ABSTRACT

The method of transferring biological specimens onto leather by using a specialized singe plate as disclosed in U.S. Pat. No. 3,298,881 entails wetting a selected section of leather with water and applying the smooth side of the wetted leather on the indented biological imprints provided by the above mentioned plate. Then, by using a press which applies equal amounts of pressure to the entire surface of the afore mentioned plate and leather, an image of the biological specimen is transferred onto the leather itself. The leather is permitted to dry, thus, setting the transferred image, and stain or dye is applied to the leather bringing out the intricate details of the image of the biological specimen, thus, creating a flexible 3-D specimen for scientific study or other endeavors.

4 Claims, 4 Drawing Sheets

METHOD OF REPLICATING IMAGES OF BIOLOGICAL SPECIMENS ONTO LEATHER

SPECIFICATION

1. Field of the Invention

The present invention relates to the transferring of biological images onto leather using the already established plates or formed thermoplastic sheets as disclosed in U.S Pat. No. 3,298,881. These plates provide an indented imprint of biological specimens; such as butterflies, seahorses or plant life, and the application for this invention refers to any and all biological specimens encompassed by U.S. Pat. No. 3,298,881. By applying stain to the transferred images on the leather, the intricate details of the specimens are enhanced, giving a 3-D view of the duplicated original biological specimen.

2. Description of the Prior Art

Techniques for transferring is commonly accomplished by the use of pressure awls or moulds of various shapes and sizes which are employed to press into parchment, leather, clay, or metal or any surface that will accept the impression Other variants are the use of heated moulds, awls, or wood-burning punches. These above methods are inoperative for providing an imprinted image of biological specimens as intricate as disclosed in U.S. Pat. No. 3,298,881. Since, the main purpose of the transparent plates (U.S. Pat. No. 3,298,881), was for examination, viewing, and the studying of biological images, the reversed indented flat monochromatic images produced by the plates did not allow adequate exact 3-D perception of how the specimen actually appeared in nature. An important disadvantage of the plates ( U.S. Pat. No. 3,298,881), from a scientific viewpoint was that the images produced in said plate were only available for studying from a fixed location, because only one single image could be produced from the original specimen per plate at a time. This caused a problem when said plate of an exact specimen was needed to be viewed by more than one person at different locations. Another disadvantage of U.S. Pat. No. 3,298,881, was that one could not bend the imprinted specimen due to the nonflexibility of the plates themselves. Also, the original transparent plate (U.S. Pat. No. 3,298,881), did not allow color shadings to enhance the image of the biological specimens, (other than the color of the polymeric sheet of which the plate was derived), thus only providing a single transparent dimensional view.

SUMMARY OF THE INVENTION

The present invention provides a flexible raised 3-D exact duplicate image of the specimen, allowing the viewer to not only see the raised transferred biological image on the leather, but, actually feel the replica of the specimen without the original specimen being present. This new application allows one to view the transferred specimen anytime or anywhere he or she desires, as the image from said plates may be transferred over and over again, supplying as many exact duplicates of the original specimen as needed from one single plate. The ability to make duplicates of the desired specimen allows more than one viewer to examine the exact same specimen from different locations at the same time. This is accomplished by the first step of wetting a selected section of leather with water and placing the smooth side of the wetted leather over the indented imprints formed by the specimens from U.S. Pat. No. 3,298,881. The present invention requires no heat, and only the use of one plate per design, per application in order to transfer the desired biological images. Next apply equal amounts of pressure to the entire surface of the plate and the wetted leather. This can be accomplished by using as much as 50 tons of pressure or more with a press that accommodates this need. Even though a lessor amount of pressure can be used, the greater the pressure the shorter the time it takes to produce the embossed impressions. After releasing the pressure the leather is then removed from the plate and allowed to dry, thus, setting the transferred image. Stain or dye is then applied to the leather which brings out the intricate details of the transferred image of the biological specimen. Due to the high transmittable properties of leather to take the relief of the indented biological images on the above mentioned plates when compressed, and retain the fine details of the original specimens, this invention relates solely to the use of leather when transferring those designs as encompassed in U.S. Pat. No. 3,298,881, as afore described.

A more thorough and comprehensive understanding may be had from the detailed description of the preferred embodiment when read in connection with the drawings and information from U.S. Pat. No. 3,298,881, forming a part of this specification.

BRIEF DESCRIPTION OF THE DRAWINGS

The present invention will be more fully understood by reference to the following detailed description thereof when read in conjunction with the attached drawings, and wherein.

DETAILED DESCRIPTION OF THE PREFERRED EMBODIMENT

Figure 1:
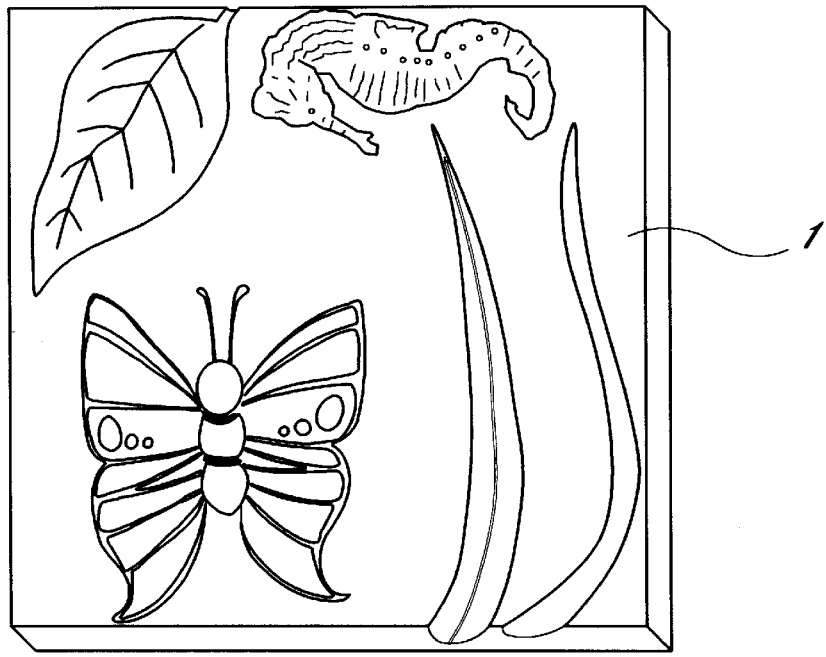
FIG. 1 is a front elevational view of the plate provided through U.S. Pat. No. 3,298,881, showing a sample of the indented biological specimen imprints.
Figure 2:
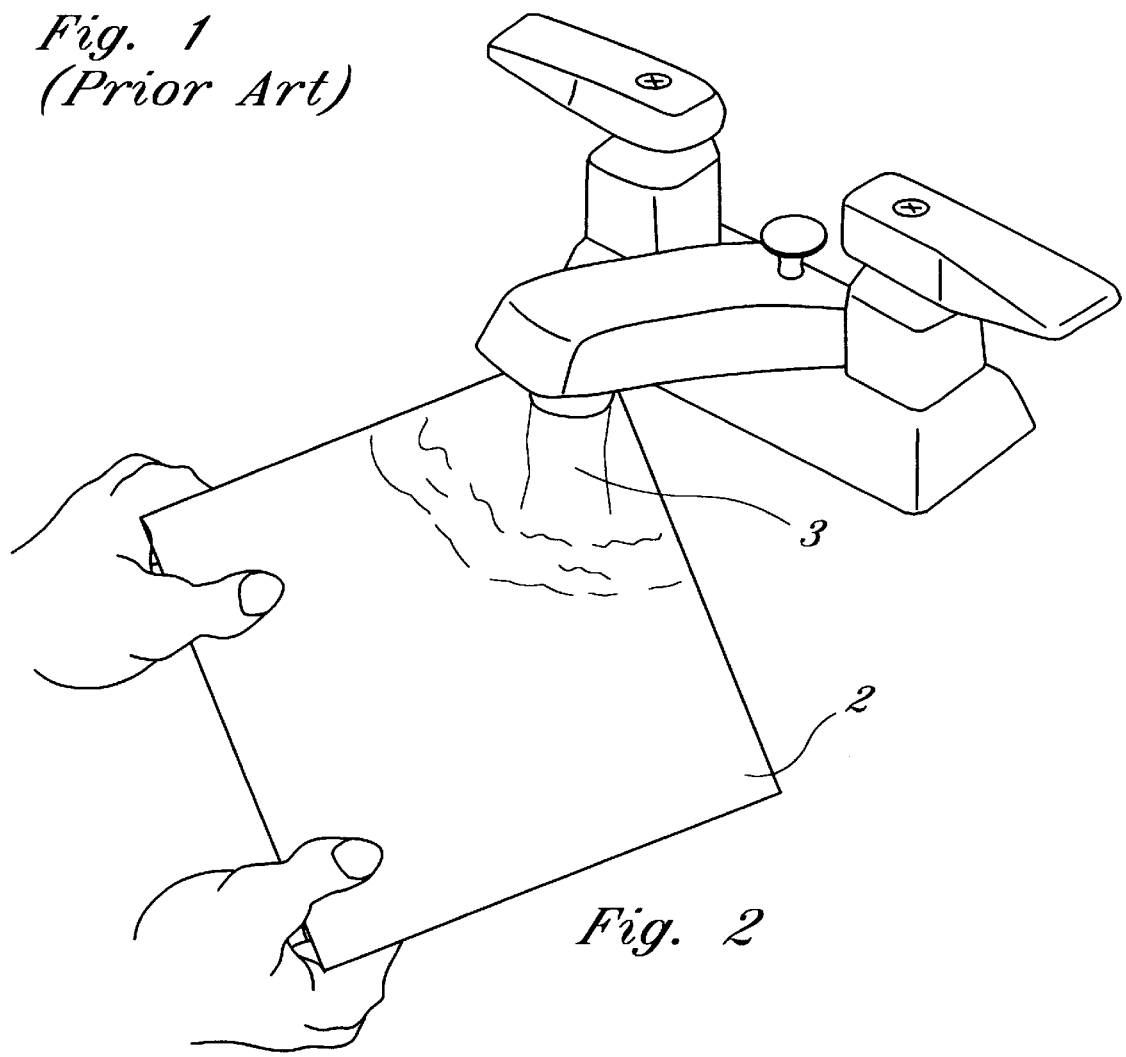
FIG. 2 is a front view of the process of wetting a selected section leather with water.

The present invention is the method of transferring biological images onto leather (2) and solely employs the use of transfer plate (1) FIG. 1 fabricated through a special process as disclosed in U.S. Pat. No. 3,298,881. This particular type of transfer plate (1) is found to have both extensive economies of production and fidelity in the type of impression it may receive and transmit and was produced for the sole purpose of preserving the images of biological specimens for study and viewing through the monochromatic, single dimensional flat form each biological imprint provided. After wetting (3) a selected section of leather with water FIG. 2, the wetted leather (2) is then placed with the smooth side (4) down over the indented images FIG. 3, formed by the plates from U.S. Pat. No. 3,298,881 as described in FIG.

Figure 3:
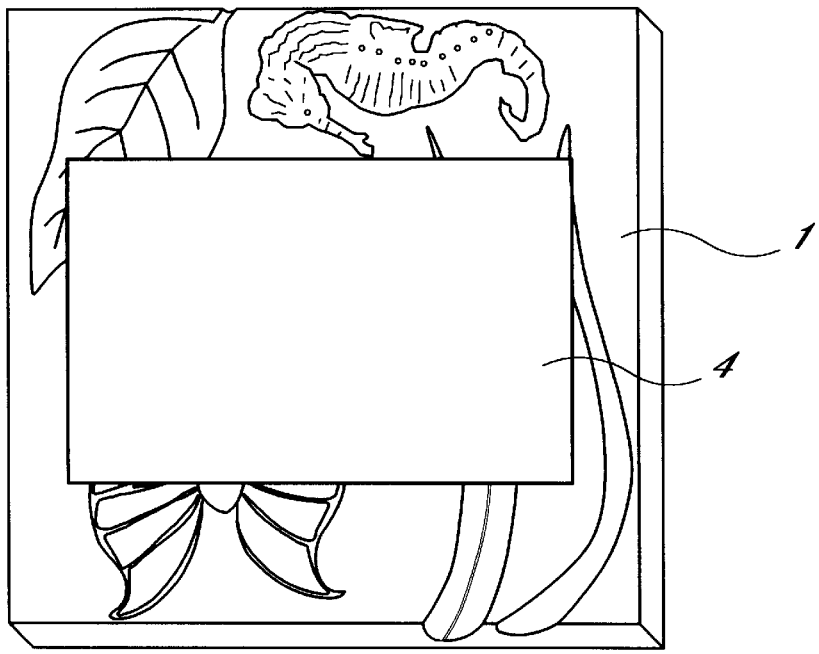
FIG. 3 is front elevational view of placing the wetted leather in FIG. 2 on a single plate as described in FIG. 1.
Figure 4:
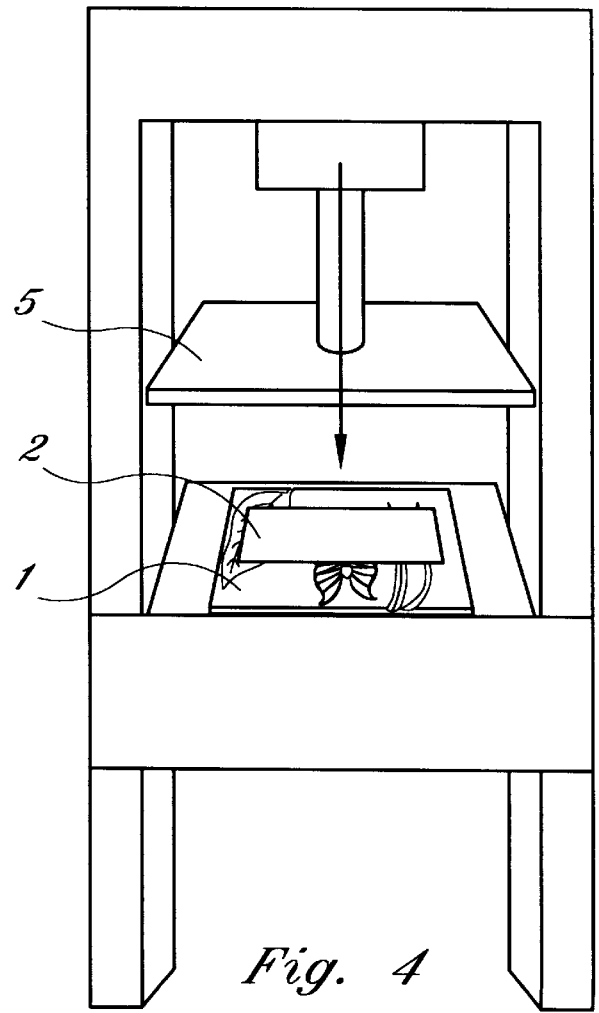
FIG. 4 is a perspective view of placing the leather and plate FIG. 3 into a press.
Figure 5:
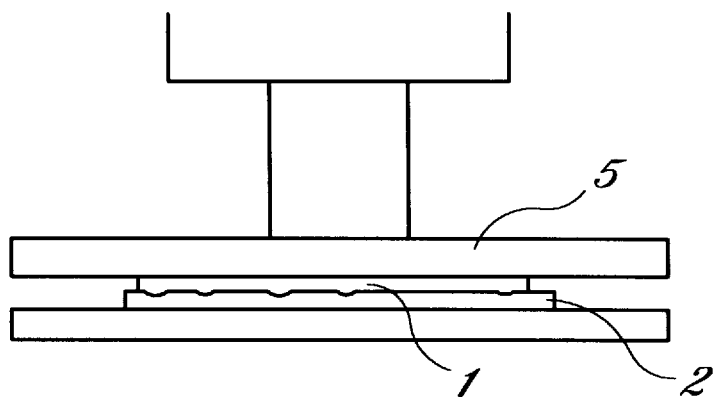
FIG. 5 is a sectional view of FIG. 4 of compressing the leather onto the images on the plate (1)
Figure 6:
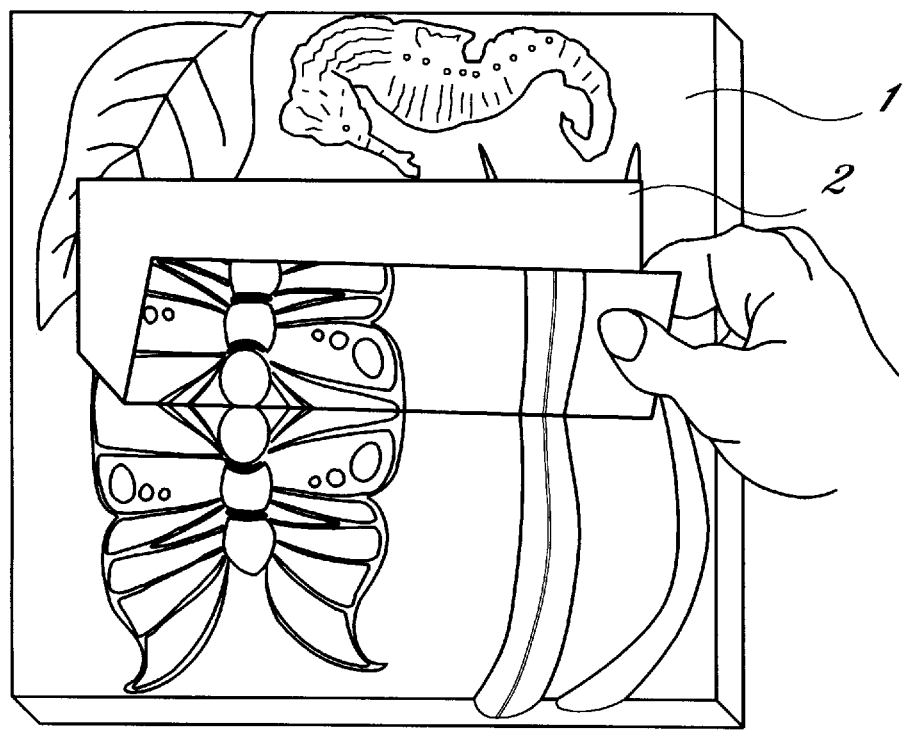
FIG. 6 is a front evelational view showing the flexibilty of the leather being removed from the plate FIG. 1 after releasing pressure from the press FIG. 3.
Figure 7:
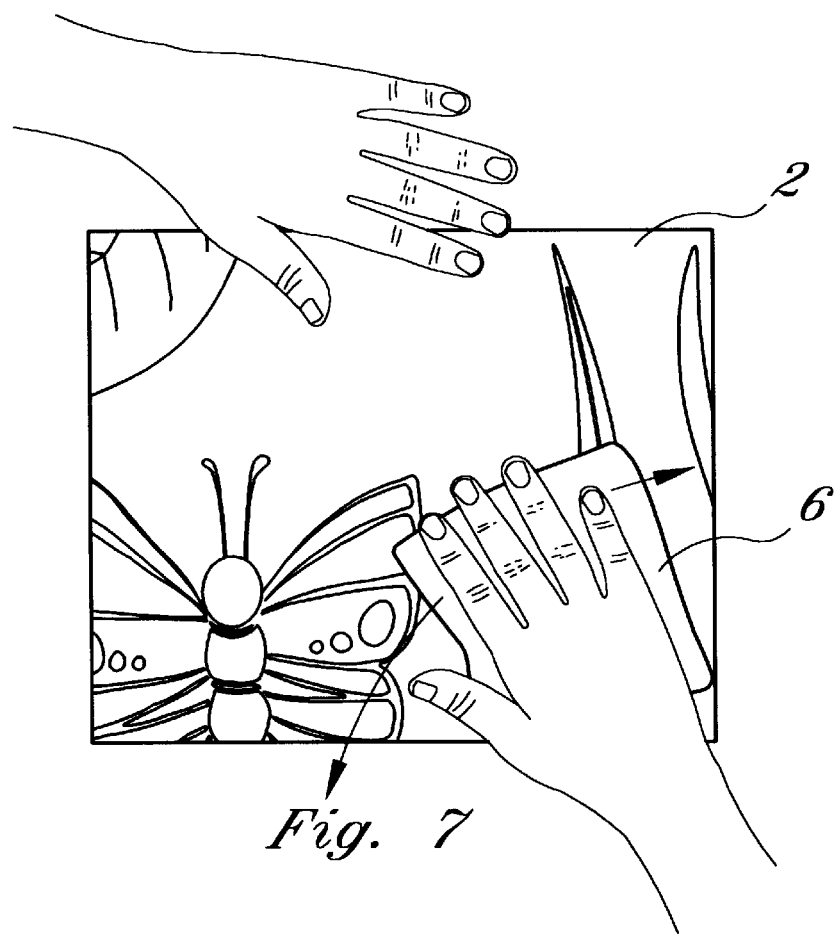
FIG. 7 is a front elevational view of the process of applying stain to the transferred images on the leather in FIG. 6 after it has dried.
Figure 8:
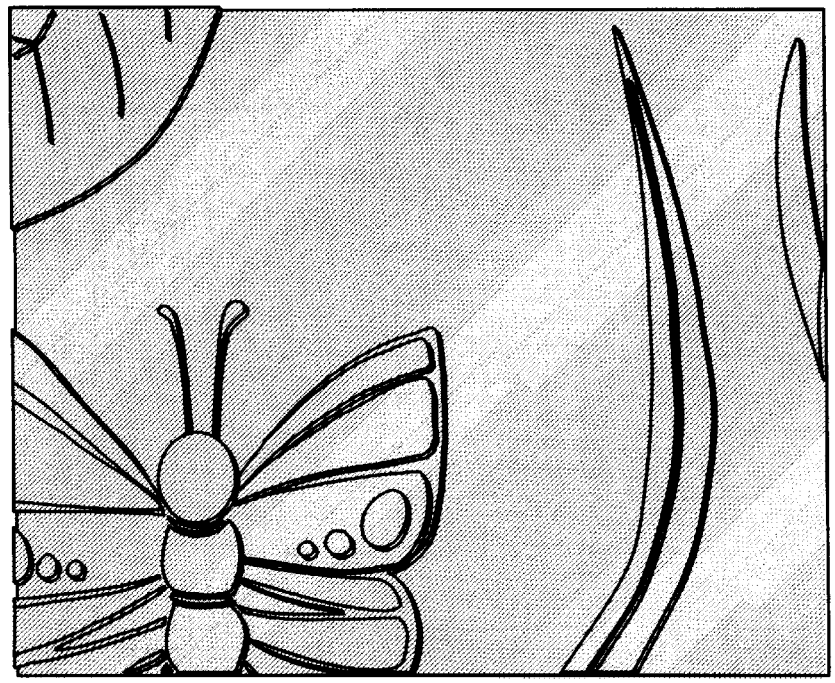
FIG. 8 is front elevational view of the embodiment showing in FIG. 7 which illustrates the intricate details and 3-D effect of the transferred images onto the leather after staining.

1. Next the leather (2) and plate (1) FIG. 3, are placed into a press FIG. 4, and equal amounts of pressure are applied to the entire surface of the afore mentioned plate (1) and leather FIG. 5. This can be accomplished by using as much as 50 tons of pressure or more with a press (5) that accommodates this need. Even though a lessor amount of pressure can be used, the greater the pressure the less amount of time it takes to produce the desired raised transferred impressions onto the leather (2) of the biological images from each plate (1). After releasing the pressure the leather (2) is then removed from the plate (1) FIG. 6, and allowed to dry, thus, setting the transferred image. By applying one or more coats of leather (2) stain (6) over the transferred images on the dried leather (2) FIG. 7, one can see how the biological images show both, depth perception and high fidelity of the design. The raised image produced on the selected section of leather (2) is of such extreme fineness, that a transverse motion of a blotting felt at suitable pressure produces a coloring only in the finer details of the relief (e.g. veins of a butterfly wing) and thus the 3-D effect along with the intricacy of every detail in the specimen itself is achieved, FIG. 8 having thus described in detail a preferred apparatus which embodies the concepts and principles of the invention and which accomplishes the various objects, purposes and aims thereof, it is to be appreciated and will be apparent to those skilled in the art.

What I claim as my invention is:

1. A method of forming a detailed three dimensional image of a biological specimen on leather comprising the steps of:

providing a formed thermoplastic sheet, having an indented facsimile impression of said biological specimen thereon, made by the method of forming an indented facsimile impression of a thickly contoured, semi-rigid biological specimen in a transparent thermoplastic sheet to faithfully and substantially microscopically reproduce three dimensional thickness detail of the specimen without materially distorting or otherwise impairing the light transmitting properties of the bordering area of the plastic sheet surrounding the facsimile impression therein, said method of forming comprising subjecting the specimen to cushioned pressure and elevated temperature for a substantial time by: sandwiching a flat-faced thermoplastic sheet and the biological specimen directly in contact with one another; directly interposing said sheet and specimen between polished plates; backing at least one of said plates with a flat sheet of cushioning material; uniformly applying to said plates sufficient pressurization to cause an impression to be made in the thermoplastic sheet when in a near-plastic condition but insufficient pressurization to permanently upset the surface configurations of the specimen, the pressurization of the specimen being characterized by an initial pressurization for an initial period, and intermediate pressurization for an intermediate period and maximum pressurization for a final period, such successive periods of pressurization each being about equal, and the initial pressurization being about one-third the final pressurization, while the intermediate pressurization is about two-thirds the final pressurization, and final pressurization being from about 30–200 psi with relatively greater maximum pressures being used for relatively more rigid specimens; heating the pressurized assembly to an elevated temperature just below the temperature of plasticity of the thermoplastic sheet; maintaining the assembly in heated condition for a time sufficient for the specimen to form an inverse impression in the near-plastic thermoplastic sheet; cooling the pressurized assembly to substantially room temperature while maintaining the pressurization thereof; then disassembling the assembly and removing the specimen from the formed thermoplastic sheet;

placing a surface of said leather over said indented facsimile impression in said formed thermoplastic sheet;

applying pressure to said formed thermoplastic sheet and leather to form a replica of said indented facsimile impression, and thus said detailed three dimensional image of a biological specimen, on said leather;

then removing said leather from said formed thermoplastic sheet; and applying stain or dye to said leather.

2. The method of claim 1 further comprising wetting said leather prior to placing a surface of said leather over said indented facsimile impression in said formed thermoplastic sheet.

3. The method of claim 2 further comprising drying said leather after removing said leather from said formed thermoplastic sheet.

4. The method of claim 1 further comprising placing a smooth surface of said leather over said indented facsimile impression in said formed thermoplastic sheet.

* * * * *